United States Patent
Kim et al.

(10) Patent No.: US 9,025,564 B2
(45) Date of Patent: May 5, 2015

(54) METHOD AND APPARATUS FOR HANDOVER IN A MOBILE COMMUNICATION SYSTEM

(75) Inventors: Soeng-Hun Kim, Suwon-si (KR); Gert Jan Van Lieshout, Staines (GB)

(73) Assignee: Samsung Electronics Co., Ltd. (KR)

( * ) Notice: Subject to any disclaimer, the term of this patent is extended or adjusted under 35 U.S.C. 154(b) by 224 days.

(21) Appl. No.: 12/747,397

(22) PCT Filed: Dec. 12, 2008

(86) PCT No.: PCT/KR2008/007381
§ 371 (c)(1),
(2), (4) Date: Oct. 12, 2010

(87) PCT Pub. No.: WO2009/075549
PCT Pub. Date: Jun. 18, 2009

(65) Prior Publication Data
US 2011/0019643 A1    Jan. 27, 2011

(30) Foreign Application Priority Data
Dec. 13, 2007  (KR) .................. 10-2007-0130191

(51) Int. Cl.
*H04W 36/02* (2009.01)
*H04L 1/18* (2006.01)

(52) U.S. Cl.
CPC ............. *H04W 36/02* (2013.01); *H04L 1/1867* (2013.01)

(58) Field of Classification Search
None
See application file for complete search history.

(56) References Cited

U.S. PATENT DOCUMENTS

| | | |
|---|---|---|
| 5,940,371 A | 8/1999 | Mitts et al. |
| 2003/0157927 A1* | 8/2003 | Yi et al. .................. 455/411 |
| 2003/0189909 A1 | 10/2003 | Chao et al. |
| 2005/0138528 A1* | 6/2005 | Ameigeiras et al. ......... 714/774 |
| 2006/0058034 A1* | 3/2006 | Vaittinen et al. ............. 455/450 |
| 2007/0081513 A1* | 4/2007 | Torsner .................. 370/349 |
| 2007/0213059 A1 | 9/2007 | Shaheen |
| 2007/0213060 A1 | 9/2007 | Shaheen |
| 2007/0224988 A1 | 9/2007 | Shaheen |
| 2007/0230400 A1* | 10/2007 | Kuchibhotla et al. ......... 370/331 |
| 2007/0291695 A1* | 12/2007 | Sammour et al. ............ 370/331 |

(Continued)

FOREIGN PATENT DOCUMENTS

| | | |
|---|---|---|
| CN | 1156945 | 8/1997 |
| JP | 9-186704 | 7/1997 |

(Continued)

OTHER PUBLICATIONS

3GPP TS 36.300 V8.1.0: (Jul. 3, 2007) 3RD Generation Partnership Project; Technical Specification Group Radio Access Network; Stage 2 (Release 8); (106 pages).

(Continued)

*Primary Examiner* — Faruk Hamza
*Assistant Examiner* — Diane Lo
(74) *Attorney, Agent, or Firm* — The Farrell Law Firm, P.C.

(57) ABSTRACT

A method and apparatus for minimizing data forwarding between Evolved Node Bs (ENBs) during handover. A User Equipment (UE) sends a status report for RLC PDUs that have suffered a change in status, to an ENB of a source cell immediately before handover occurs, thus preventing RLC PDUs which have been successfully transmitted, but for which ACK signals have not yet been received, from being forwarded.

14 Claims, 8 Drawing Sheets

(56) References Cited

U.S. PATENT DOCUMENTS

2008/0064390 A1* 3/2008 Kim .............................. 455/425
2009/0042573 A1* 2/2009 Vedantham et al. .......... 455/436
2009/0310534 A1* 12/2009 Lindskog et al. ............. 370/328
2010/0195617 A1* 8/2010 Park et al. .................... 370/331

FOREIGN PATENT DOCUMENTS

| WO | WO 2007/052922 | 5/2007 |
| WO | WO 2007/108655 | 9/2007 |
| WO | WO 2007/130325 | 11/2007 |

OTHER PUBLICATIONS

PCT/ISA/237 Written Opinion issued in PCT/KR2008/007381 (4 pp.).
Alcatel-Lucent, "RLC Status Reporting During Handover", R2-071635, 3GPP TSG-RAN#58 WG 2 LTE, May 7-11, 2007.
Qualcomm, "RLC Prioritization Scheme", R2-051967, 3GPP TSG-RAN WG2 Meeting #48, Aug. 29-Sep. 2, 2005.
Alcatel-Lucent, "Intra-Frequency Measurement Reporting Events", R2-074962, 3GPP TSG RAN WG2 #60, Nov. 5-9, 2007.
European Search Report dated Feb. 17, 2015 issued in counterpart application No. 08860272.7-1854.

* cited by examiner

METHOD AND APPARATUS FOR HANDOVER IN A MOBILE COMMUNICATION SYSTEM

BACKGROUND OF THE INVENTION

1. Field of the Invention

The present invention relates generally to a method and apparatus for handover in a mobile communication system, and in particular, to a method and apparatus for reducing the data which is forwarded between base stations during handover in a mobile communication system.

2. Description of the Related Art

A Universal Mobile Telecommunication Service (UMTS) system, one of the mobile communication systems, is a $3^{rd}$ generation (3G) asynchronous mobile communication system that uses Wideband Code Division Multiple Access (WCDMA), based on Global System for Mobile Communications (GSM) and General Packet Radio Services (GPRS) which are European mobile communication systems.

In $3^{rd}$ Generation Partnership Project (3GPP) in charge of UMTS standardization, Long Term Evolution (LTE) is now under discussion as a next-generation mobile communication system of the UMTS system. LTE, expected to be commercialized in around 2010, is a technology for realizing high-speed packet based communication supporting a transfer rate of a maximum of about 100 Mbps. For this technology, a discussion is made on several schemes, including, for example, a scheme of reducing the number of nodes located in the communication path by simplifying a configuration of the network and a scheme of maximally approximating wireless protocols to wireless channels.

Figure 1:
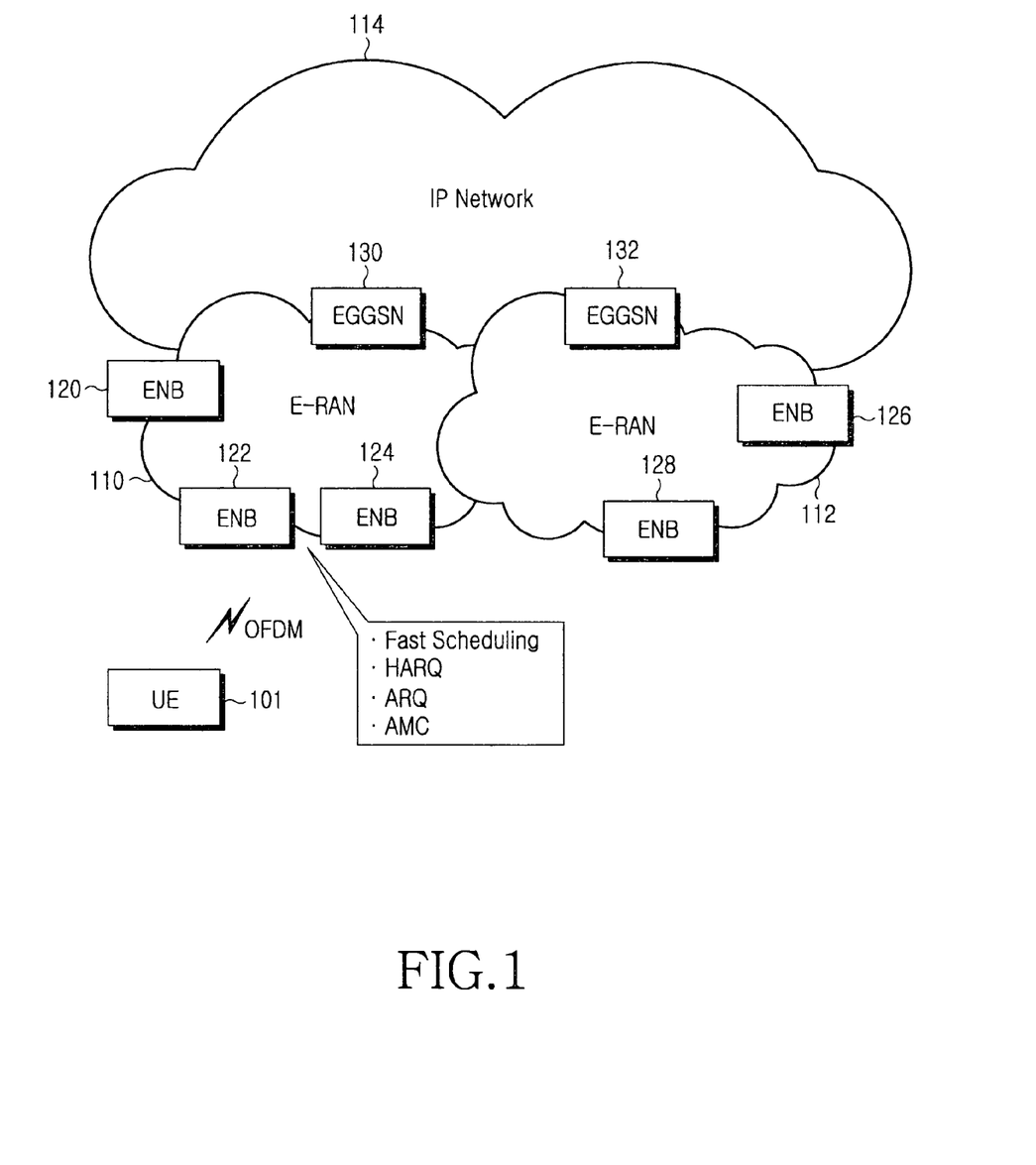
FIG. 1 is a diagram illustrating an example of a system configuration based on a UMTS system among the next-generation mobile communication systems.

FIG. 1 is a diagram illustrating an example of a system configuration based on a UMTS system among the next-generation mobile communication systems.

Referring to FIG. 1, as illustrated, it is intended that Evolved Radio Access Networks (E-RANs) 110 and 112 are simplified to a 2-node configuration consisting of Evolved Node Bs (ENBs, or Node Bs) 120, 122, 124, 126 and 128, and Enhanced Gateway GPRS Support Node (EGGSNs) 130 and 132. A User Equipment (UE) 101 accesses an Internet Protocol (IP) network 114 by means of the E-RANs 110 and 112.

The ENBs 120 to 128, which correspond to the existing Node Bs of the UMTS system, are connected to the UE 101 by wireless channels. Compared with the existing Node Bs, the ENBs 120 to 128 perform more complicated functions. In LTE, since all user traffics including the real-time services such as Voice over IP (VoIP) are serviced over a shared channel, an apparatus is needed that gathers status information of UEs and performs scheduling based on the gathered information, and the ENBs 120 to 128 serve as the apparatus. Commonly, one ENB controls a plurality of cells. In order to realize the transfer rate of a maximum of 100 Mbps, LTE uses Orthogonal Frequency Division Multiplexing (OFDM) as its wireless access technology in a 20-MHz bandwidth. Also, LTE employs Adaptive Modulation & Coding (AMC) that adaptively determines a modulation scheme and a channel coding rate according to channel states of UEs.

Figure 2:
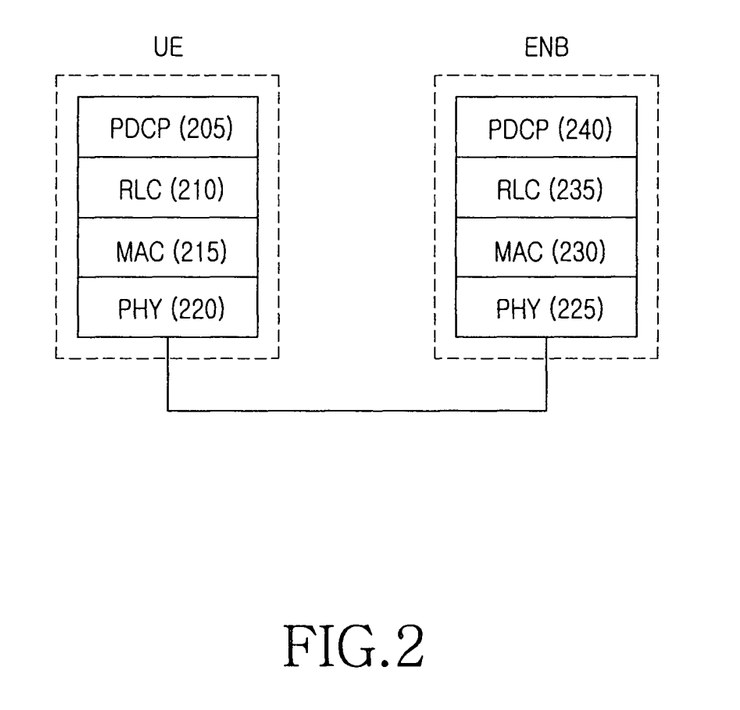
FIG. 2 is a diagram illustrating a hierarchical structure of wireless protocols for an LTE system.

FIG. 2 is a diagram illustrating a hierarchical structure of wireless protocols for an LTE system. With reference to FIG. 2, a description will now be made of the hierarchical structure of wireless protocols for the LTE system.

As illustrated in FIG. 2, wireless protocols of the LTE system include Packet Data Convergence Protocol (PDCP) 205 and 240, Radio Link Control (RLC) 210 and 235, and Medium Access Control (MAC) 215 and 230.

PDCP 205 and 240 take charge of an operation such as IP header compression/decompression, and RLC 210 and 235 reconfigure PDCP Packet Data Units (PDUs) in an appropriate size and perform an Automatic Repeat reQuest (ARQ) operation. In the following description, a packet output from a particular protocol entity will be referred to as a PDU of the protocol. MAC 215 and 230, which are connected to several RLC entities formed in one UE, perform an operation of multiplexing RLC PDUs to a MAC PDU, and demultiplexing RLC PDUs from a MAC PDU. Physical layers (PHY) 220 and 225 perform an operation of channel-coding and modulating upper layer data to make OFDM symbols and transmitting the OFDM symbols over a wireless channel, or an operation of demodulating and channel-decoding OFDM symbols received over a wireless channel and delivering the OFDM symbols to the upper layer.

While a UE is staying in one cell without moving to another cell, RLC entities ensure reliable data transmission/reception. On the contrary, when a UE moves to another cell, the UE removes the RLC entities used in the old cell and forms new RLC entities, so that a data loss may occur if continuity of the ARQ operation is not guaranteed. In a handover process, a source ENB forwards, to a target ENB, the PDCP SDUs for which it has not yet received transmission success/failure information (or ACK/NACK) at the RLC level, in order to prevent a possible data loss. However, since a link between ENBs is generally low in speed, it is preferable to reduce, if possible, the amount of data which is forwarded from the source ENB to the target ENB during handover.

SUMMARY OF THE INVENTION

An aspect of the present invention is to address at least the problems and/or disadvantages and to provide at least the advantages described below. Accordingly, an aspect of the present invention provides a method and apparatus for transmitting/receiving a status report so that an amount of data which is forwarded from a source ENB to a target ENB during handover of a UE is minimized.

Another aspect of the present invention provides a method and apparatus in which a UE that has sensed handover makes a status report which is formed only of the minimum necessary information.

According to one aspect of the present invention, there is provided a handover method of a User Equipment (UE) in a mobile communication system. The handover method includes determining whether handover is imminent; when handover is imminent, generating a Radio Link Control (RLC) status report message including information on a highest sequence number among sequence numbers of RLC Packet Data Units (PDUs) which have been successfully received from an Evolved Node B (ENB); and sending the generated RLC status report message to the ENB.

According to another aspect of the present invention, there is provided a handover apparatus of a User Equipment (UE) in a mobile communication system. The apparatus includes a Radio Link Control (RLC) status report controller for, upon recognizing the imminence of handover, generating an RLC status report message including information on a highest sequence number among sequence numbers of RLC PDUs which have been successfully received from an Evolved Node B (ENB); and a physical layer for sending the generated RLC status report message to the ENB.

According to further another aspect of the present invention, there is provided a method for supporting handover of a User Equipment (UE) by an Evolved Node B (ENB) in a mobile communication system. The method includes generating a measurement setting message including at least one measurement object, a measurement result report generation condition and measurement identifiers, and sending the measurement setting message to the UE so that the UE can determine the imminence of handover; receiving, from the UE, a measurement result report for a measurement having a high possibility of triggering handover, and an RLC status report message including information on a highest sequence number among sequence numbers of RLC PDUs that the UE has successfully received; and forwarding, to a target ENB, remaining data except for the RLC PDUs that the UE has successfully received, depending on the received RLC status report message.

According to yet another aspect of the present invention, there is provided an apparatus for supporting handover of a User Equipment (UE) by an Evolved Node B (ENB) in a mobile communication system. The apparatus includes a handover controller for generating a measurement setting message including at least one measurement object, a measurement result report generation condition and measurement identifiers, and sending the measurement setting message to the UE so that the UE can determine the imminence of handover; a Radio Resource Control (RRC) layer for receiving, from the UE, a measurement result report for a measurement having a high possibility of triggering handover, and an RLC status report message including information on a highest sequence number among sequence numbers of RLC PDUs that the UE has successfully received; and a data transmission controller for forwarding, to a target ENB, remaining data except for the RLC PDUs that the UE has successfully received, depending on the received RLC status report message.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings.

In the following description, a detailed description of known functions and configurations incorporated herein has been omitted for clarity and conciseness.

The present invention provides a method and apparatus in which a UE that has sensed the imminence of handover generates RLC status report messages only for the RLC entities having a high possibility of reducing data forwarding and includes only the information necessary for data forwarding reduction in the RLC status report messages, instead of generating and sending RLC status report messages for all RLC entities.

Figure 3:
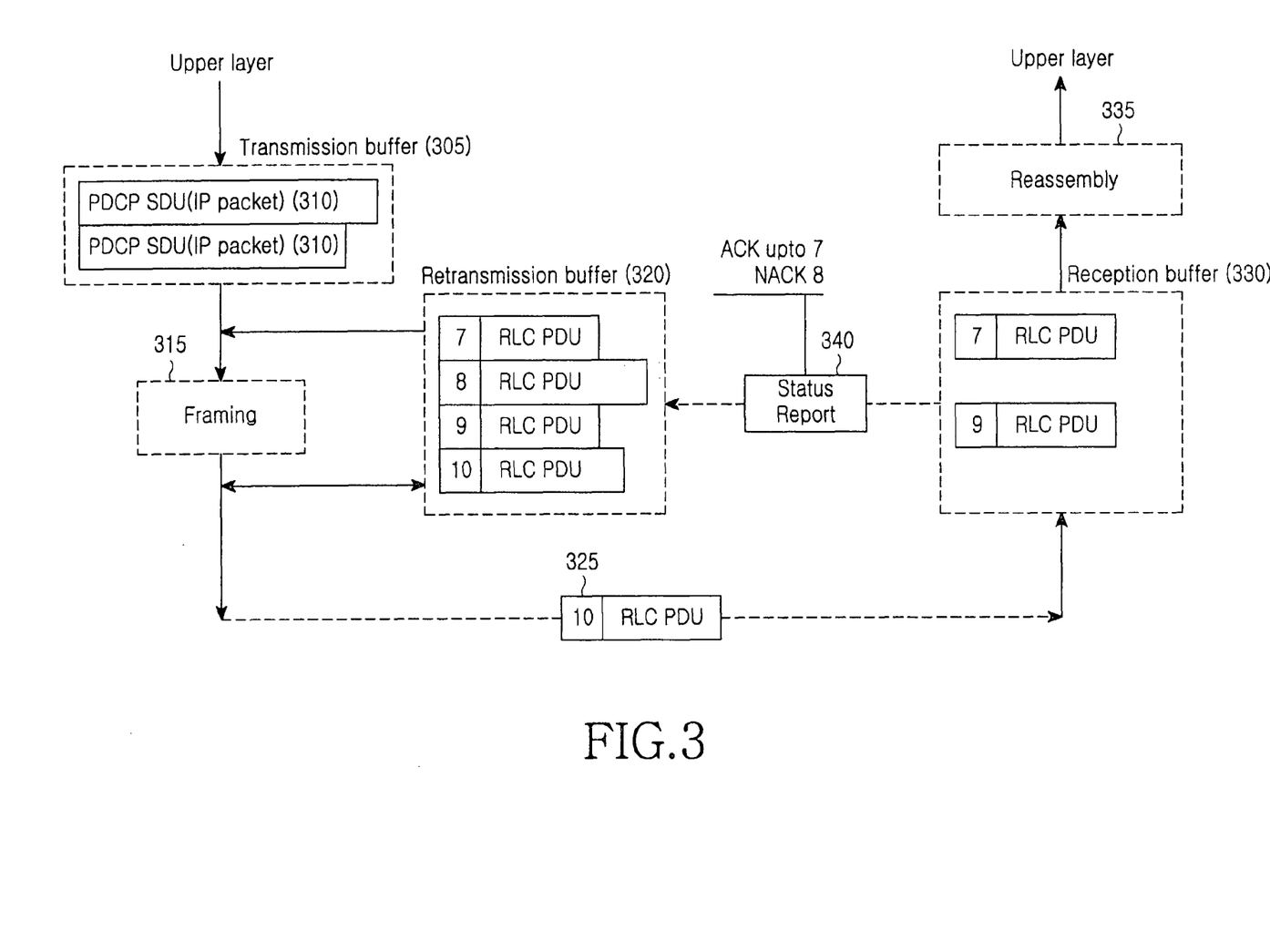
FIG. 3 is a diagram illustrating an example of an RLC operation ensuring reliability of data transmission/reception.

FIG. 3 is a diagram illustrating an example of an RLC operation ensuring reliability of data transmission/reception. An RLC operation will be described below with reference to FIG. 3.

A transmission buffer 305 for a transmission apparatus, included in a PDCP entity or an RLC entity, stores PDCP SDUs 310 which have not yet been transmitted to a reception apparatus, or whose transmission success/failure has not yet been checked even though they were transmitted. A framing block 315 reconfigures PDCP SDUs 310 in an appropriate size, and forms RLC PDUs by attaching monotonously-increasing sequence numbers to them. The transmission apparatus stores the RLC PDUs in a retransmission buffer 320 until ACK signals are received from a receiving-side RLC entity. Upon receipt of an ACK signal for an arbitrary RLC PDU, the transmission apparatus discards the corresponding RLC PDU from the retransmission buffer 320. As transmission success of the RLC PDU is checked, if transmission success of a PDCP SDU corresponding to the successfully transmitted RLC PDU is also checked and it is determined that all PDCP SDUs, which were transmitted before the successfully transmitted PDCP SDU, have also been successfully transmitted, then the transmission apparatus discards the PDCP SDUs transmitted before the PDCP SDU, including the PDCP SDU, from the transmission buffer 305.

The receiving-side RLC entity stores received RLC PDUs in a reception buffer 330, and checks sequence numbers thereof to detect a sequence number of an RLC PDU lost during its transmission. When a predetermined condition is satisfied, the receiving-side RLC entity generates an RLC status report message and sends it to a transmitting-side RLC entity. The RLC status report message contains information on an RLC PDU reception status of the receiving-side RLC entity, and the transmitting-side RLC entity detects successfully-transmitted RLC PDUs and transmission-failed RLC PDUs depending on the RLC status report message. An exemplary format of the RLC status report message is shown in Table 1.

TABLE 1

| Type = RLC Status Report Message |
| --- |
| ACK_SN = highest sequence number among sequence numbers of successfully received RLC PDUs |
| NACK_SN = sequence number of a missing RLC PDU |
| . . . |
| NACK_SN = sequence number of a missing RLC PDU |

The RLC status report message is composed of one ACK_SN, or of one ACK_SN and more than one NACK_SN. The presence/absence of NACK_SN is indicated by a separate flag, which is not included in Table 1 for convenience.

The ACK_SN field contains the highest sequence number among the sequence numbers of RLC PDUs successfully received up to now, and the NACK_SN field contains sequence numbers of missing RLC PDUs.

For example, it is assumed that at an arbitrary time, the transmitting-side RLC entity transmitted RLC PDU[7]~RLC PDU[10], and the receiving-side RLC entity received only RLC PDU[7] and RLC PDU[9] and stored them in the reception buffer 330.

When an RLC Status Report Message Generation Condition is satisfied at an arbitrary time, the receiving-side RLC entity generates an RLC status report message. In this case, an ACK_SN field of the RLC status report message contains a sequence number 9 and a NACK_SN field contains a sequence number 8. The transmitting-side RLC entity, which has received the RLC status report message, discards from the retransmission buffer 320 RLC PDUs having sequence numbers lower than the lowest NACK_SN, i.e., RLC PDUs whose sequence numbers are lower than 7, determining that they were all successfully transmitted. Also, the transmitting-side RLC entity discards PDCP SDUs mapped to the RLC PDUs whose sequence numbers are lower than 7, among the PDCP SDUs stored in the transmission buffer 305. The transmitting-side RLC entity retransmits RLC PDU[8] that the receiving-side RLC entity has failed to receive.

The transmitting-side RLC entity transmits an RLC PDU with a sequence number attached thereto, checks transmission success/failure for the transmitted RLC PDU using a received RLC status report message, and retransmits the RLC PDU when necessary, thereby guaranteeing reliable transmission/reception.

By receiving a normal RLC status report message, the transmitting-side RLC entity can acquire the following two types of information.

First, the transmitting-side RLC entity can acquire identification information of a transmission-failed RLC PDU using the NACK_SN field. Based on the acquired identification information of the transmission-failed RLC PDU, the transmitting-side RLC entity can determine which RLC PDU it should retransmit later.

Second, the transmitting-side RLC entity can acquire identification information of a successfully transmitted RLC PDU using the ACK_SN field. Based on the acquired identification information of the successfully transmitted RLC PDU, the transmitting-side RLC entity can determine which of RLC PDUs and/or PDCP SDUs stored in the retransmission buffer 320 and the transmission buffer 305 it will discard.

If handover is carried out while an ENB's transmission apparatus is performing a normal ARQ operation with a UE's reception apparatus, the transmission apparatus forwards to a target ENB the PDCP SDUs for which it has failed to receive transmission success/failure information from an RLC entity. However, at the imminence of handover, the transmission apparatus may fail to perform retransmission as it has no spare time for the retransmission. Therefore, at the imminence of handover, the former information—the identification information of transmission-failed RLC PDUs, used for selecting RLC PDUs to be retransmitted—is not so useful, whereas the latter information—identification information of successfully transmitted RLC PDUs, used for selecting RLC PDUs and/or RLC PDUs to be discarded—can be valuable.

For example, at an arbitrary time before handover is executed, a UE makes a report that it has successfully received up to an RLC PDU with a sequence number x, by sending an RLC status report message. Assume that thereafter, n more RLC PDUs are transmitted and the remaining RLC PDUs except for an RLC PDU with a sequence number [x+m] among the n RLC PDUs are successfully transmitted. If no new RLC status report message is generated and sent before handover is performed, the ENB forwards all PDCP SDUs mapped to the n RLC PDUs to the target ENB because it cannot determine which of the n RLC PDUs has been successfully transmitted. If the UE has generated and sent an RLC status report message containing all of ACK_SN and NACK_SN shown in Table 1 immediately before handover is carried out, the ENB attempts to perform a necessary operation based on the RLC status report message. That is, the ENB prepares for retransmission of the transmission-failed RLC PDUs according to the former information detected from the RLC status report message, and discards the PDCP SDUs mapped to the RLC PDUs ordered at the ARQ level among the successfully transmitted RLC PDUs, from the transmission buffer according to the latter information. However, at the imminence of handover, there is a high possibility that the UE will move to the target ENB before the source ENB performs retransmission on the transmission-failed RLC PDUs. In other words, the former information of NACK_SN may probably be useless.

Based on the foregoing, when a UE perceives that handover is imminent, the UE generates RLC status report messages for its receiving-side RLC entities, and includes only the information necessary for data forwarding reduction in the RLC status report messages. The information necessary for data forwarding reduction can be the highest sequence number among the sequence numbers of RLC PDUs ordered at the ARQ level, which corresponds to the ACK_SN field in Table 1.

Also, according to the present invention, upon detecting the imminence of handover, the UE generates and sends an RLC status report message only for the RLC entity having the RLC PDU which has been successfully received, but for which a reception success report has not yet been made, instead of generating RLC status report messages for all RLC entities.

The existence of the RLC PDU which has been successfully received, but for which a reception success report has not yet been made means existence of the data that will be unnecessarily forwarded unless the UE generates and sends an RLC status report message. On the other hand, if the UE has already sent RLC status report messages for all received RLC PDUs, generating and sending a new RLC status report message is meaningless.

When a UE is not allocated transmission resources enough to send all RLC status report messages, the UE preferentially sends an RLC status report message by the RLC entity having a greater number of the RLC PDUs which have been successfully received, but for which reception success reports have not yet been made.

Figure 4:
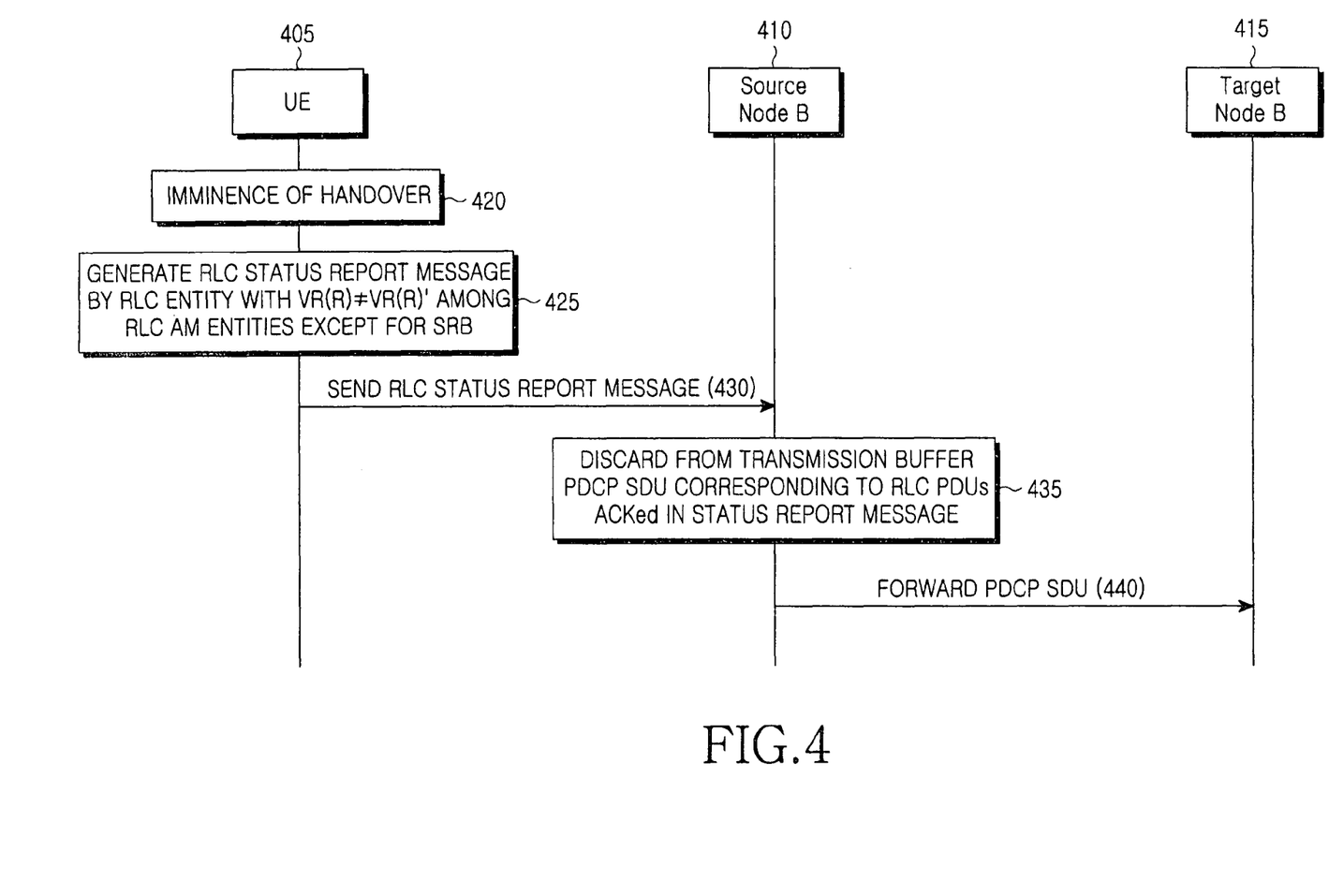
FIG. 4 is a flow diagram illustrating the entire handover operation according to an embodiment of the present invention.

FIG. 4 is a flow diagram illustrating the entire handover operation according to an embodiment of the present invention. In a mobile communication system including a UE 405, a source ENB 410 and a target ENB 415, each of which is driven by a plurality of RLC entities, the UE 405 can recognize that handover is imminent. The UE 405 can perceive the imminence of handover in various methods. For example, in one method, the ENB can notify the UE of the imminence of handover.

In another method, the UE can determine that handover is imminent if a measurement result report having a high possibility of triggering handover is generated. For example, the measurement result report having a high possibility of triggering handover can include a measurement result report indicating that a wireless channel quality of an arbitrary neighbor cell is higher than a wireless channel quality of the current cell.

Among various types of measurement result reports, a certain measurement result report can be predetermined as a measurement result report having a high possibility of triggering handover. For example, all measurement result reports except for additional measurement result reports can be defined as a measurement result report having a high possibility of triggering handover, or only some particular measurement result reports, including a particular measurement result report indicating that a wireless channel quality of a neighbor cell is higher than a wireless channel quality of the current cell, can be defined as a measurement result report having a high possibility of triggering handover. The ENB can preset which measurement result report has a higher possibility of triggering handover.

Commonly, a method of measuring whether or not a possibility of triggering handover is high includes sending, by an ENB, measurement setting information to a UE, performing, by the UE, measurement based on the measurement setting information, and reporting the measurement result. The measurement setting information can include setting information for a plurality of possible measurements. Setting information for one measurement is composed of information as to which measurement object the UE will measure and information as to which condition should be satisfied to configure a measurement result report. Each of the plurality of measurements is identified by a measurement identifier (ID).

Meanwhile, when delivering the measurement setting information to the UE, the ENB can indicate the fact that a particular measurement result has a high possibility of triggering handover by transmitting a measurement ID corresponding to the particular measurement together. For example, when a measurement result report occurs by a measurement indicated by a measurement ID x, the ENB can insert a predetermined ID, called a measurement ID x, in the measurement setting information being transmitted to the UE so that the UE can determine that handover is imminent. When the measurement result report occurs which is generated by the measurement setting information in which the predetermined ID is inserted, the UE can perform an operation described in the present invention, determining that handover is imminent.

Referring back to FIG. 4, when a UE 405 senses the imminence of handover in the above-stated manner in step 420, the UE 405 generates RLC status report messages for RLC entities satisfying all the following conditions, among the currently formed RLC entities in step 425. Generation conditions of RLC status report messages will now be described below.

RLC Status Report Message Generation Condition
RLC entity operating in RLC AM
RLC entity which is not an SRB
RLC entity with VR(R)≠VR(R)'

An RLC entity operates in an RLC Acknowledged Mode (AM) or an RLC Unacknowledged Mode (UM) according to whether ARQ is enabled, and RLC AM means an operation mode where ARQ is enabled. An RLC entity operating in the RLC UM does not use the RLC status report message, so the present invention is not applied thereto.

A Signaling Radio Bearer (SRB) is a radio bearer that processes packets generated in a Radio Resource Control (RRC) layer. Since an RLC entity of the SRB does not forward PDCP SDUs though it operates in the RLC AM, the UE has no need to reduce forwarding by using the RLC status report messages. Therefore, even though handover is imminent, the UE does not need to generate and send a new RLC status report message.

VR(R) represents a sequence number at the bottom of the reception buffer at the present time. RLC PDUs having sequence numbers lower than VR(R) have already been delivered to the upper layer, and they are PDUs which have been completely ordered at the ARQ level. The receiving-side RLC entity assembles the RLC PDUs ordered at the ARQ level in RLC SDUs, delivers them to the upper layer, and stores, in VR(R), a sequence number greater by 1 than the highest sequence number among the sequence numbers of the RLC PDUs delivered to the upper layer. To be more specific, the expression 'being ordered up to PDU[x] at the ARQ level' means that since it is determined that all RLC PDUs having sequence numbers lower than x have been received, or even though there are missing RLC PDUs among the RLC PDUs having sequence numbers lower than x, there is no possibility that the missing RLC PDUs will be received any longer, all the RLC PDUs with sequence numbers lower than x are assembled in RLC SDUs and then delivered to the upper layer, and only the RLC PDUs with sequence numbers higher than x are stored in the reception buffer of the RLC entity. VR(R) is a value which is greater by 1 than the highest sequence number among the sequence numbers of the RLC PDUs ordered at the ARQ level, and it is generally considered that RLC PDUs with sequence numbers lower than VR(R) are ordered at the ARQ level.

VR(R)' is VR(R) at a time when the UE has last sent an RLC status report, and the receiving-side RLC entity updates VR(R) at the corresponding time to VR(R)' every time it generates and sends an RLC status report message. Upon receipt of the RLC status report message, a transmitting-side RLC entity estimates VR(R) at the time based on information in the RLC status report message, and discards RLC PDUs ordered at the ARQ level and PDCP SDUs mapped to the RLC PDUs from the retransmission buffer and the transmission buffer. Therefore, the transmitting-side RLC entity stores RLC PDUs with sequence numbers higher than VR(R)' and PDCP SDUs mapped to the RLC PDUs in the retransmission buffer and the transmission buffer. Thus, if VR(R) is greater than VR(R)' by k, it means that the transmitting-side RLC entity unnecessarily stores k RLC PDUs, and will unnecessarily forward PDCP SDUs mapped to the k RLC PDUs during handover. Therefore, a difference between VR(R) and VR(R)' is closely related to the amount of data that will be unnecessarily forwarded when the UE does not newly notify VR(R) using an RLC status report message. If VR(R)' is equal to VR(R), it means that data forwarding is not reduced even though the UE updates VR(R) with a new value by sending an RLC status report message.

When handover is imminent, the UE generates an RLC status report message shown in Table 2 for RLC entities satisfying the RLC Status Report Message Generation Condition.

TABLE 2

| Type = RLC Status Report Message |
| --- |
| ACK_SN = V(R) −1 |

ACK_SN contains the highest sequence number among the sequence numbers of the RLC PDUs that have already been delivered to the upper layer at the corresponding time. In other words, ACK_SN contains the highest sequence number among the sequence numbers of the RLC PDUs currently ordered at the ARQ level, i.e., a value determined by subtracting 1 from VR(R). No NACK_SN is contained in the RLC status report message. In step 430, the UE sends one or a plurality of the generated RLC status report messages to the ENB using uplink transmission resources allocated by the ENB. The RLC status report messages can be sent together with other data, for example, a measurement report message and/or a buffer status report message, and when the allocated transmission resources are not sufficient, the UE determines whether to transmit the data according to predetermined priority.

The priority used for determining which of the RLC status report messages the UE will first send can be priority of a logical channel to which the RLC status report message belongs. It can also be considered that as a difference between VR(R) and VR(R)' is greater, priority of the RLC status report message is higher.

A difference DIFF_x between VR(R) and VR(R)' of an arbitrary RLC entity x can be calculated as Equation (1).

$$DIFF\_x = MOD\ [(VR(R) - VR(R)'), 1024] \quad (1)$$

At the imminence of handover, the UE generates RLC status report messages for the RLC entities satisfying RLC Status Report Message Generation Condition, and assigns priorities to the RLC status report messages in descending order of DIFF. When it is not possible to send all RLC status report messages at a time because of a lack of uplink transmission resources, the UE sends the RLC status report messages in order of priority. The RLC status report message can be sent through an RLC control message or an RRC control message. When a UE sends RLC status report messages through the RLC control message, the UE sends RLC status report messages separately for logical channels, the messages are individually byte aligned, and MAC headers are individually attached to the messages, causing considerable overhead. On the other hand, when the RLC status report information is contained in the RRC control message, only one MAC header is used, contributing to a reduction in overhead. When the RLC status report information is contained in the RRC control message, the RRC control message contains a logical channel ID and the highest sequence number among the sequence numbers of RLC PDUs ordered at the ARQ level, separately for each RLC entity satisfying RLC Status Report Message Generation Condition. Upon receipt of the RLC status report message, the ENB discards in step 435 an RLC PDU corresponding to the highest sequence number and RLC PDUs with sequence numbers lower than the highest sequence number from the retransmission buffer and also discards PDCP SDUs mapped to the discarded RLC PDUs from the transmission buffer based on ACK_SN in the RLC status report message, i.e., the highest sequence number among the sequence numbers of the RLC PDUs ordered at the ARQ level. In forwarding PDCP SDUs, the ENB forwards only the remaining SDUs except for the discarded PDCP SDUs in step 440.

Figure 5:
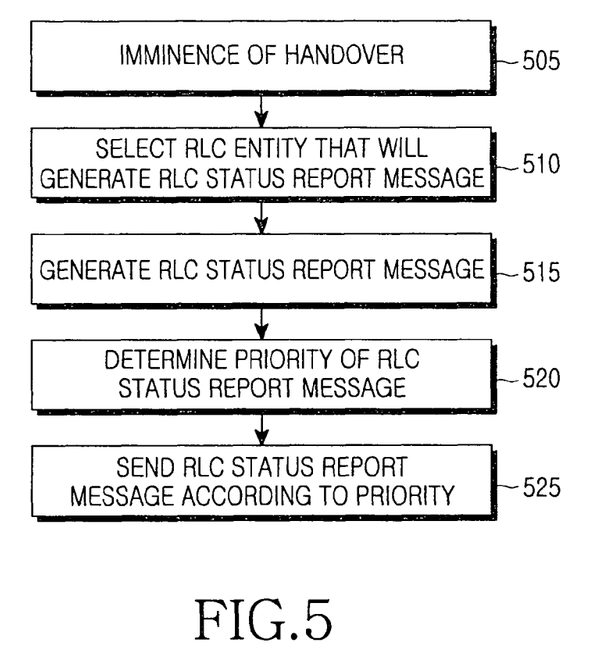
FIG. 5 is a diagram illustrating a UE's operation according to an embodiment of the present invention.

FIG. 5 illustrates a UE's operation according to an embodiment of the present invention.

In step 505, the UE recognizes that handover is imminent, in a predetermined manner. As described above, the generation of a predetermined measurement result report can be associated with the imminence of handover. In step 510, the UE selects an RLC entity coinciding with RLC Status Report Message Generation Condition. In step 515, the UE generates an RLC status report message for each RLC entity agreeing with RLC Status Report Message Generation Condition. ACK_SN in the RLC status report message contains a value determined by subtracting 1 from VR(R), i.e., the highest sequence number among the highest sequences of the RLC PDUs ordered at the ARQ level. In step 520, the UE determines priorities of a plurality of RLC status report messages. The priority can be equal to the original priority of a logical channel of the RLC status report message. That is, high priority can be assigned to an RLC status report message occurring in a high-priority logical channel, while low priority can be given to an RLC status report message occurring in a low-priority logical channel. Otherwise, priority can be assigned according to a difference between VR(R) and VR(R)' of a logical channel where an RLC status report message occurs. For example, higher priority can be set for an RLC status report message occurring in a logical channel where the value calculated by Equation (1) is greater, while lower priority can be established for an RLC status report message occurring in a logical channel where the value calculated by Equation (1) is smaller. In step 525, the UE sends RLC status report messages according to the determined priorities. That is, when the possible amount of transmission data is limited, the UE preferentially sends higher-priority RLC status report messages.

Figure 6:
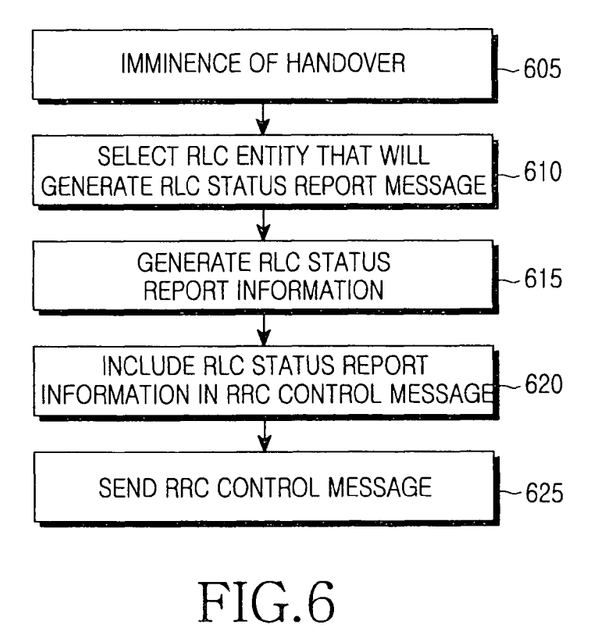
FIG. 6 is a flowchart illustrating an operation in which a UE sends RLC status report information through an RRC control message according to an embodiment of the present invention.

FIG. 6 is a flowchart illustrating an operation in which a UE sends RLC status report information through an RRC control message according to an embodiment of the present invention.

In step 605, a UE perceives that handover is imminent, in a predetermined manner. In step 610, the UE identifies an RLC entity coinciding with RLC Status Report Message Generation Condition. In step 615, the UE generates RLC status report information for each RLC entity coinciding with RLC Status Report Message Generation Condition. The RLC status report information is composed of a logical channel ID which is an ID of an RLC entity, and the highest sequence number among sequence numbers of RLC PDUs ordered at the ARQ level. In step 620, the UE includes a plurality of pieces of RLC status report information in a predetermined RRC control message, e.g., a measurement result report message. In step 625, the UE sends the RRC control message.

Figure 7:
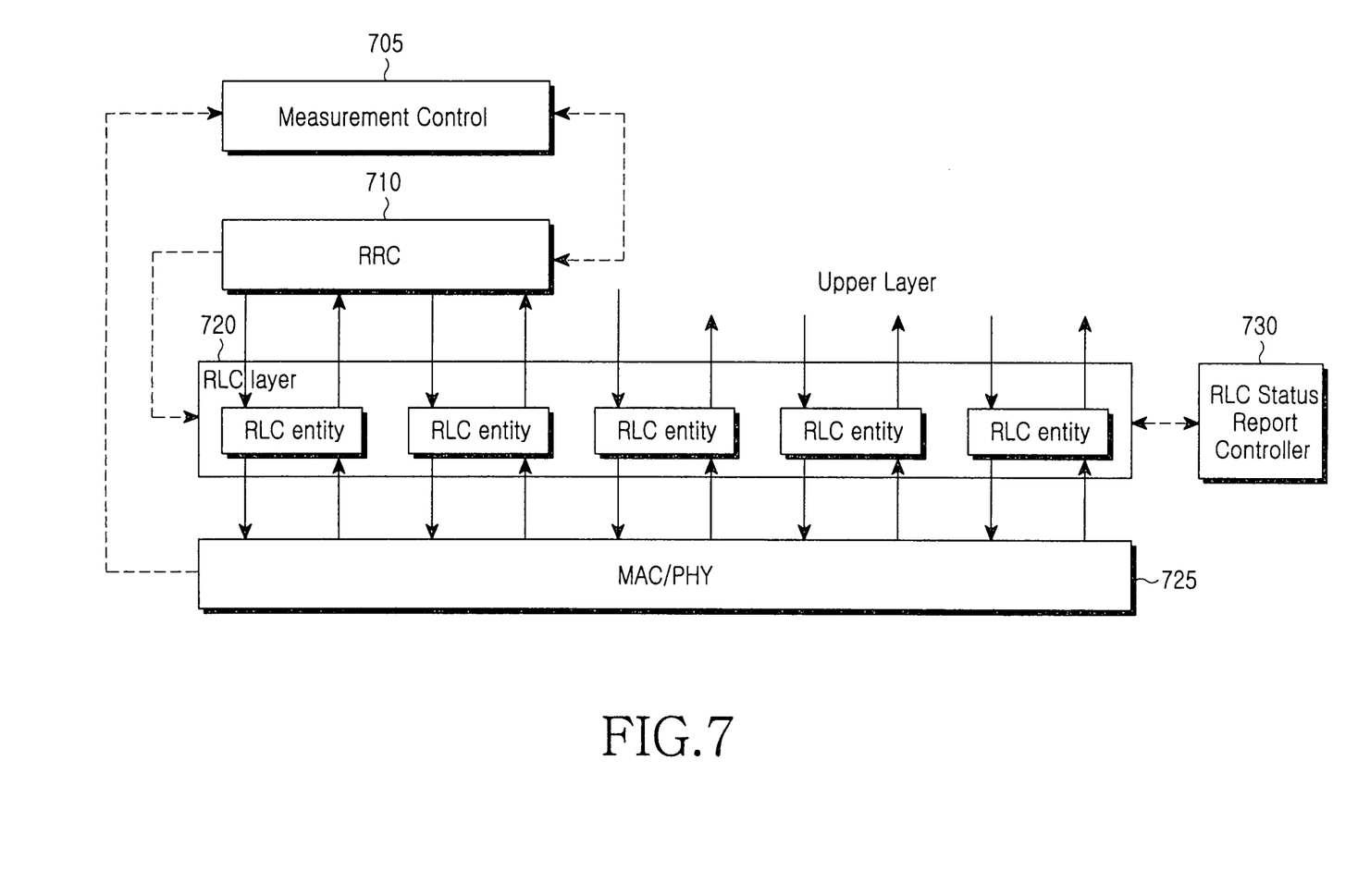
FIG. 7 is a diagram illustrating a structure of an UE apparatus according to an embodiment of the present invention.

FIG. 7 is a diagram illustrating major blocks of an UE apparatus according to an embodiment of the present invention.

Referring to FIG. 7, a UE according to an embodiment of the present invention includes a measurement controller 705, an RRC layer 710, an RLC layer 720, a MAC/PHY layer 725, and an RLC status report controller 730. The measurement controller 705 controls a process of measuring received signal strength of the UE, and delivers the measurement result to be contained in a measurement result report to the RRC layer 710 when a measurement result reporting condition is satisfied. Upon receipt of a report on the measurement result from the measurement controller 705, the RRC layer 710 generates an RRC control message called a measurement result report based thereon. The RRC control message may contain RLC status report information as well. The RLC status report controller 730, when it recognizes the imminence of handover, identifies an RLC entity satisfying RLC Status Report Message Generation Condition, and controls the corresponding RLC entity to generate an RLC status report message or RLC status report information indicating the highest sequence number among sequence numbers of RLC PDUs ordered at the ARQ level. The RLC status report message is sent as separate RLC control information later, and the RLC status report information is contained in predetermined RRC control information after being gathered by an RRC entity.

The RLC layer 720 is a set of RLC entities in charge of reliable transmission/reception of upper layer data or RRC control messages, and the MAC/PHY layer 725 is an entity in charge of transmission/reception of RLC PDUs.

Figure 8:
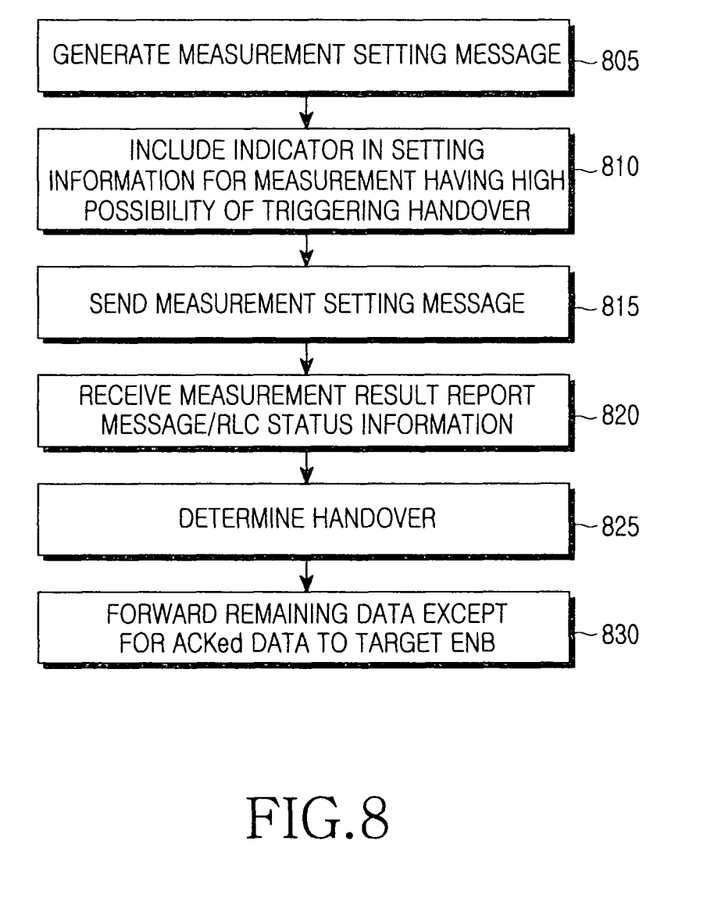
FIG. 8 is a diagram illustrating an operation of an ENB apparatus according to an embodiment of the present invention.

FIG. 8 is a diagram illustrating an operation of an ENB apparatus according to an embodiment of the present invention.

In step 805, an ENB generates a measurement setting message for setting a measurement a UE will carry out. The measurement setting message may contain a plurality of pieces of measurement setting information. In step 810, the ENB includes a predetermined indicator in setting information for a measurement having a high possibility of triggering handover, indicating that the corresponding measurement has a high possibility of triggering handover. In step 815, the ENB sends the control message containing the measurement setting information to the UE. After the control message is sent, the UE and the ENB perform a normal LTE communication process, and when a measurement satisfying a measurement reporting condition occurs among the measurements set in the measurement setting message, the UE generates a measurement result report and sends it to the ENB, and the ENB receives the measurement result report. If the measurement result report is a measurement result report for a measurement having a high possibility of triggering handover, the UE also transmits RLC status information for predetermined RLC entities as described in the present invention, and the ENB also receives RLC status information together.

In step 825, the ENB determines to hand the UE over to an arbitrary target cell, and starts a predetermined handover prepare procedure with an ENB managing the target cell. In step 830, the ENB delivers the remaining data except for ACKed data to the ENB managing the target cell based on the RLC status information received in step 820.

Figure 9:
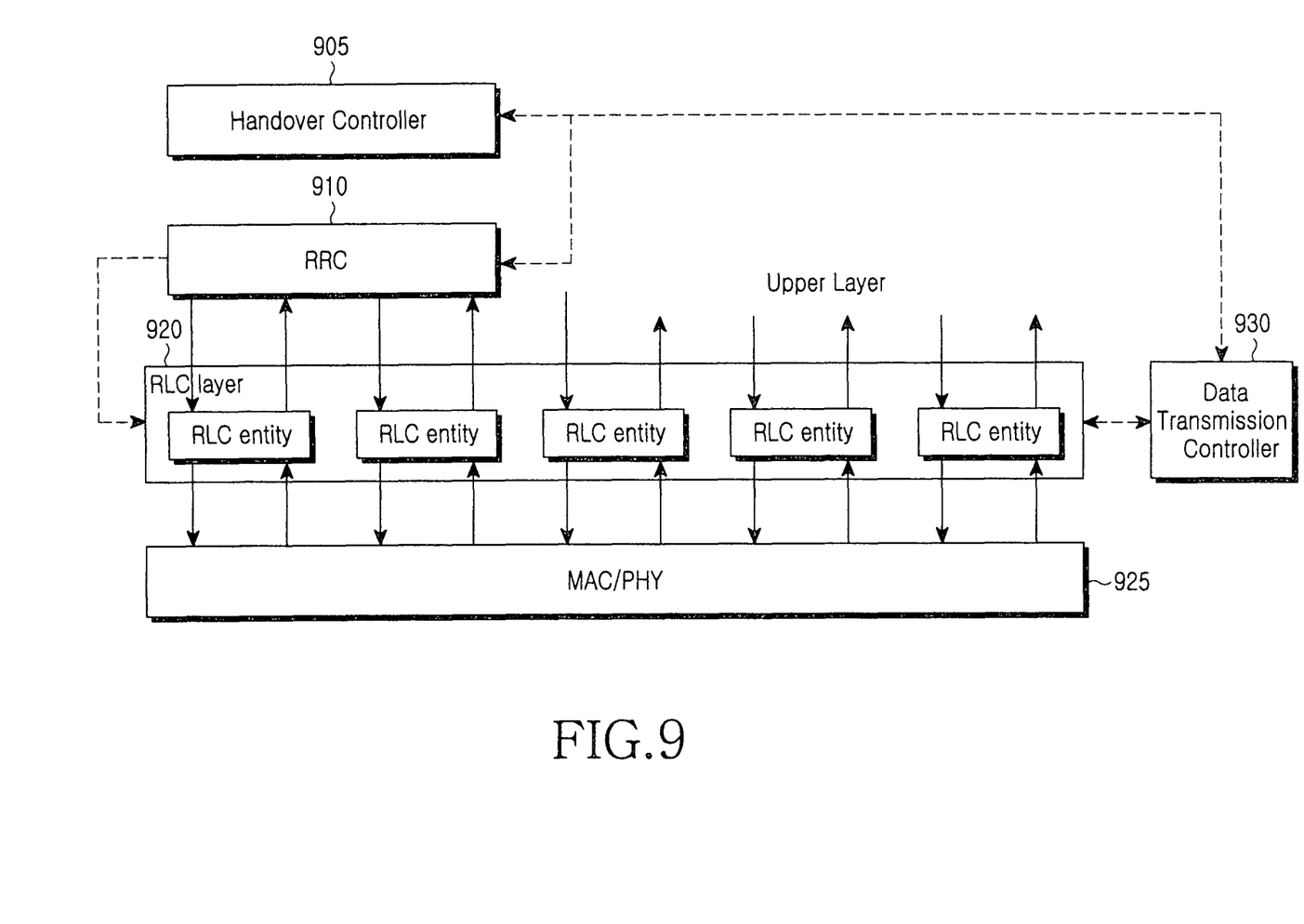
FIG. 9 illustrates a structure of an ENB apparatus according to an embodiment of the present invention.

FIG. 9 illustrates a structure of an ENB apparatus according to an embodiment of the present invention.

Referring to FIG. 9, an ENB according to an embodiment of the present invention includes a handover controller 905, an RRC layer 910, an RLC layer 920, a MAC/PHY layer 925, and a data transmission controller 930. The handover controller 905 determines handover of a UE based on a measurement result report message sent by the UE. The RRC layer 910 determines a measurement it will set for the UE during a call setup process with the UE, and sends a measurement setting message containing setting information for the measurement. When the measurement setting message includes therein setting information for a measurement having a high possibility of triggering handover, the ENB includes a predetermined indicator in the setting information for the measurement. Upon receipt of a measurement result report message from the UE, the RRC layer 910 delivers a measurement result in the message to the handover controller 905. When RLC status report information is received together with the measurement result report message, the RRC layer 910 delivers the RLC status report information to a corresponding RLC entity. When the handover controller 905 determines handover, the data transmission controller 930 identifies data that does not need to be delivered to an ENB managing the target cell, out of the data stored in the RLC entities and other Layer-2 buffers, and controls delivery of the corresponding data.

The RLC layer 920 is a set of RLC entities in charge of reliable transmission/reception of upper layer data or RRC control messages, and the MAC/PHY layer 925 is an entity in charge of transmission/reception of RLC PDUs.

As is apparent from the foregoing description, according to the present invention, the UE sends a status report message for a logical channel satisfying a predetermined condition to the source ENB before handover occurs, thus preventing the RLC PDUs which were successfully transmitted, but for which ACK signals have not yet been received from the UE, from being forwarded from the source cell to the target cell.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A handover method of a User Equipment (UE) in a mobile communication system, the method comprising:
   receiving measurement setting information from an Evolved Node B (ENB);
   performing a measurement by the UE based on the measurement setting information;
   when the measurement satisfies a measurement result report generation condition included in the measurement setting information, generating a measurement result report, transmitting the measurement result report to the ENB, and recognizing, by the UE, that handover is imminent based on the measurement setting information;
   if the measurement result report generation condition triggering the measurement result report to be transmitted is a first type, generating a Radio Link Control (RLC) status report message including information related to a highest sequence number among sequence numbers of RLC Packet Data Units (PDUs) which have been successfully received from the ENB; and
   sending the generated RLC status report message to the ENB,
   wherein the first type indicates that the measurement result report of a neighbor cell is better than a measurement of a serving cell for a certain period of time.

2. The handover method of claim 1, wherein the measurement setting information includes at least one measurement object and measurement identifiers.

3. The handover method of claim 1, wherein generating the RLC status report message comprises:
   generating an RLC status report message for an RLC entity that operates in an RLC Acknowledged Mode (AM), is not a Signaling Radio Bearer (SRB), and has an RLC PDU which has been successfully received, but for which a reception success report has not been made.

4. The handover method of claim 1, wherein sending the RLC status report message comprises:
   determining priorities of a plurality of RLC status report messages according to priority of a logical channel or in descending order of the number of RLC PDUs which have been successfully received, but for which reception success reports have not been made, and sending the RLC status report messages according to the determined priorities.

5. The handover method of claim 1, wherein the RLC status report message comprises a logical channel identifier, which is an identifier of an RLC entity, and a highest sequence number among sequence numbers of RLC PDUs ordered at an Automatic Repeat reQuest (ARQ) level.

6. A handover apparatus of a User Equipment (UE) in a mobile communication system, the apparatus comprising:
   a Radio Link Control (RLC) status report controller for receiving measurement setting information from an Evolved Node B (ENB), performing a measurement based on the measurement setting information, generating a measurement result report and recognizing that handover is imminent when the measurement satisfies a measurement result report generation condition included in the measurement setting information, and generating an RLC status report message including information related to a highest sequence number among sequence numbers of RLC PDUs which have been successfully received from the ENB if the measurement result report generation condition triggering the measurement result report to be transmitted is a first type; and a physical layer for sending the generated measurement report and the generated RLC status report message to the ENB, wherein the first type indicates that the measurement result report of a neighbor cell is better than a measurement of a serving cell for a certain period of time.

7. The handover apparatus of claim 6, wherein the measurement setting information includes at least one measurement object and measurement identifiers.

8. The handover apparatus of claim 6, wherein the RLC status report controller generates an RLC status report message for an RLC entity that operates in an RLC Acknowledged Mode (AM), is not a Signaling Radio Bearer (SRB), and has an RLC PDU which has been successfully received, but for which a reception success report has not been made.

9. The handover apparatus of claim 6, wherein the RLC status report controller determines priorities of a plurality of RLC status report messages according to priority of a logical channel or in descending order of the number of RLC PDUs which have been successfully received, but for which reception success reports have not been made, and sends the RLC status report messages according to the determined priorities.

10. The handover apparatus of claim 6, wherein the RLC status report message comprises a logical channel identifier, which is an identifier of an RLC entity, and a highest sequence number among sequence numbers of RLC PDUs ordered at an Automatic Repeat reQuest (ARQ) level.

11. A method for supporting handover of a User Equipment (UE) by an Evolved Node B (ENB) in a mobile communication system, the method comprising:

sending measurement setting information to the UE so that the UE can determine imminence of handover and perform a measurement;

receiving, from the UE, when the measurement performed by the UE satisfies a measurement result report generation condition included in the measurement setting information, a measurement result report, and if the measurement result report generation condition triggering the measurement result report is a first type, receiving, from the UE, an RLC status report message including information related to a highest sequence number among sequence numbers of RLC PDUs that the UE has successfully received; and forwarding, to a target ENB, remaining data except for the RLC PDUs that the UE has successfully received, depending on the received RLC status report message, wherein the first type indicates that the measurement result report of a neighbor cell is better than a measurement of a serving cell for a certain period of time.

12. The method of claim 11, wherein the measurement setting information includes at least one measurement object and measurement identifiers.

13. An apparatus for supporting handover of a User Equipment (UE) by an Evolved Node B (ENB) in a mobile communication system, the apparatus comprising:

a handover controller for sending a measurement setting information to the UE so that the UE can determine the imminence of handover and perform a measurement;

a Radio Resource Control (RRC) layer for receiving, from the UE, when the handover imminence indication is sent or the measurement performed by the UE setting information satisfies a measurement result report generation condition included in the measurement setting information, a measurement result report, and receiving, from the UE, if the measurement result report generation condition triggering the measurement result report to be transmitted is a first type, an RLC status report message including information related to a highest sequence number among sequence numbers of RLC PDUs that the UE has successfully received; and a data transmission controller for forwarding, to a target ENB, remaining data except for the RLC PDUs that the UE has successfully received, depending on the received RLC status report message, wherein the first type indicates that the measurement result report of a neighbor cell is better than a measurement of a serving cell for a certain period of time.

14. The apparatus of claim 13, wherein the measurement setting information includes at least one measurement object and measurement identifiers.

\* \* \* \* \*